US006762947B2

(12) United States Patent
Hammond (10) Patent No.: US 6,762,947 B2
(45) Date of Patent: Jul. 13, 2004

(54) CONTROL METHOD AND APPARATUS TO REDUCE CURRENT THROUGH DC CAPACITOR LINKING TWO STATIC CONVERTERS

(75) Inventor: Peter W. Hammond, Greensburg, PA (US)

(73) Assignee: Robicon Corporation, New Kensington, PA (US)

( * ) Notice: Subject to any disclaimer, the term of this patent is extended or adjusted under 35 U.S.C. 154(b) by 0 days.

(21) Appl. No.: 10/300,403

(22) Filed: Nov. 20, 2002

(65) Prior Publication Data

US 2003/0223251 A1 Dec. 4, 2003

Related U.S. Application Data

(60) Provisional application No. 60/385,682, filed on Jun. 4, 2002.

(51) Int. Cl.[7] .................................................. H02J 3/36
(52) U.S. Cl. .......................................... 363/35; 363/51
(58) Field of Search .............................. 363/35, 34, 37, 363/50, 53, 51; 361/93.9, 15, 18

(56) References Cited

U.S. PATENT DOCUMENTS

| 4,521,840 | A | * | 6/1985 | Hoadley | 363/35 |
|---|---|---|---|---|---|
| 4,894,762 | A | * | 1/1990 | Steinshorn | 363/35 |
| 5,535,113 | A | * | 7/1996 | Konishi | 363/35 |
| 5,625,545 | A | | 4/1997 | Hammond | |
| 6,014,323 | A | | 1/2000 | Aiello et al. | |
| 6,166,513 | A | | 12/2000 | Hammond | |
| 6,236,580 | B1 | | 5/2001 | Aiello et al. | |
| 6,301,130 | B1 | | 10/2001 | Aiello et al. | |
| 6,400,585 | B2 | * | 6/2002 | Jiang-Hafner | 363/35 |

OTHER PUBLICATIONS

DC Link Current Ripple In Back–to–Back Converters, by N. J. Wheeler, H. Zhang and D. A. Grant, Industrial Electronics Group, University of Bristol, UK, pp. 47–50.

* cited by examiner

Primary Examiner—Shawn Riley
(74) Attorney, Agent, or Firm—Buchanan Ingersoll, P.C.

(57) ABSTRACT

A control method and apparatus to reduce current through a DC capacitor linking two converters causes the value of the DC-side current output of the first converter to approach the value of the DC-side input current into the second converter, thus minimizing the DC capacitor current which is equal to the difference between the output current from the first converter and the input current into the second converter.

30 Claims, 7 Drawing Sheets

CONTROL METHOD AND APPARATUS TO REDUCE CURRENT THROUGH DC CAPACITOR LINKING TWO STATIC CONVERTERS

CROSS REFERENCE TO RELATED APPLICATIONS

This application claims priority to U.S. Provisional Patent Application Serial No. 60/385,682, filed Jun. 4, 2002.

FIELD OF THE INVENTION

The invention relates generally to AC power converters, typically in AC power supplies used to drive AC motors which use one or more power cells having a first converter to convert input AC power into an intermediate DC link, a capacitor connected across the intermediate DC link for smoothing, and a second converter to convert the DC power into output AC power. More particularly, the invention relates to a control method to reduce the current through the capacitor in the link between the two converters.

BACKGROUND

A power supply to control the flow of energy between a first AC system at a first frequency and first voltage and first phase count and a second AC system at a second frequency and second voltage and second phase count is commonly required in a wide variety of industrial applications, often to control the operation of an AC motor. Conventionally, such a power supply is often implemented using one or more power cells consisting of two solid state converters connected by an intermediate DC link, typically including a DC filter capacitor for smoothing. Most commonly, the phase count in both AC systems is three, but the phase counts can have any integral value, and can be different in the two AC systems.

The size of the DC filter capacitor is dependent on two factors. First, the capacitor chosen must be capable of carrying the r.m.s. current imposed on it. Second, the capacitor chosen must provide enough capacitance to hold the ripple on the DC voltage within the design limits for the application. Both of these factors can be reduced if the capacitor current is reduced. Since the DC filter capacitor is usually one of the largest and most expensive components in the power cell, it is very desirable to minimize its size and cost.

SUMMARY

A control method and apparatus according to the invention can reduce the current through the DC filter capacitor in the link between two static converters within a power cell, thus permitting the size and cost of the capacitor to be reduced. Each static converter controls the flow of power between its AC-side and its DC-side. The capacitor current is equal to the difference between the DC-side current from the first converter and the DC-side current into the second converter. Therefore the capacitor current will be minimized if the two converter DC-side currents are caused to be as nearly equal as possible. The DC-side current into the second converter is normally determined by the requirements of the application, and therefore cannot be controlled. In such cases the capacitor current will be minimized if the DC-side current from the first converter is caused to be generally equal to the DC-side current into the second converter. Each of the two converter DC-side currents contain a steady component and one or more alternating components. The steady components will automatically be equal because no steady current can flow through the DC filter capacitor. Therefore, the alternating components should be caused to match as closely as possible. Some of the alternating components of the second converter DC-side current will be related to the switching frequency of the semiconductors in the second converter. If the first converter has a similar switching frequency, it generally may not be possible to match these components. This is because the control bandwidth of a switched-mode converter is always significantly lower than the switching frequency. However, other alternating components of the second converter DC-side current will generally be related to the operating frequency of the second AC system. If these components are sufficiently lower in frequency than the switching frequency of the first converter, then it can be possible to match these components.

The switching frequency of the first converter generally must be significantly greater than the operating frequency of the second AC system. A circuit for the first converter can be a pulse-width modulated (PWM) converter, which has a switching frequency that is independent of the operating frequency.

Other details, objects, and advantages of the invention will become apparent from the following detailed description and the accompanying drawings illustrating certain embodiments thereof.

BRIEF DESCRIPTION OF THE DRAWING FIGURES

A more complete understanding of the invention can be obtained by considering the following detailed description in conjunction with the accompanying drawings, in which:

FIG. 3a illustrates the topology of a prior art power supply employing multiple power cells.

FIG. 3b is a diagram of the configuration of a power cell employed in the power supply in FIG. 3a.

FIG. 5 is a diagram illustrating a presently preferred topology for a power supply employing multiple power cells of the type shown in FIG. 4 or FIG. 6a.

FIG. 6b is a diagram of a presently preferred embodiment of a control scheme for the power cell shown in FIG. 6a.

DETAILED DESCRIPTION OF CERTAIN EMBODIMENTS

Figure 1:
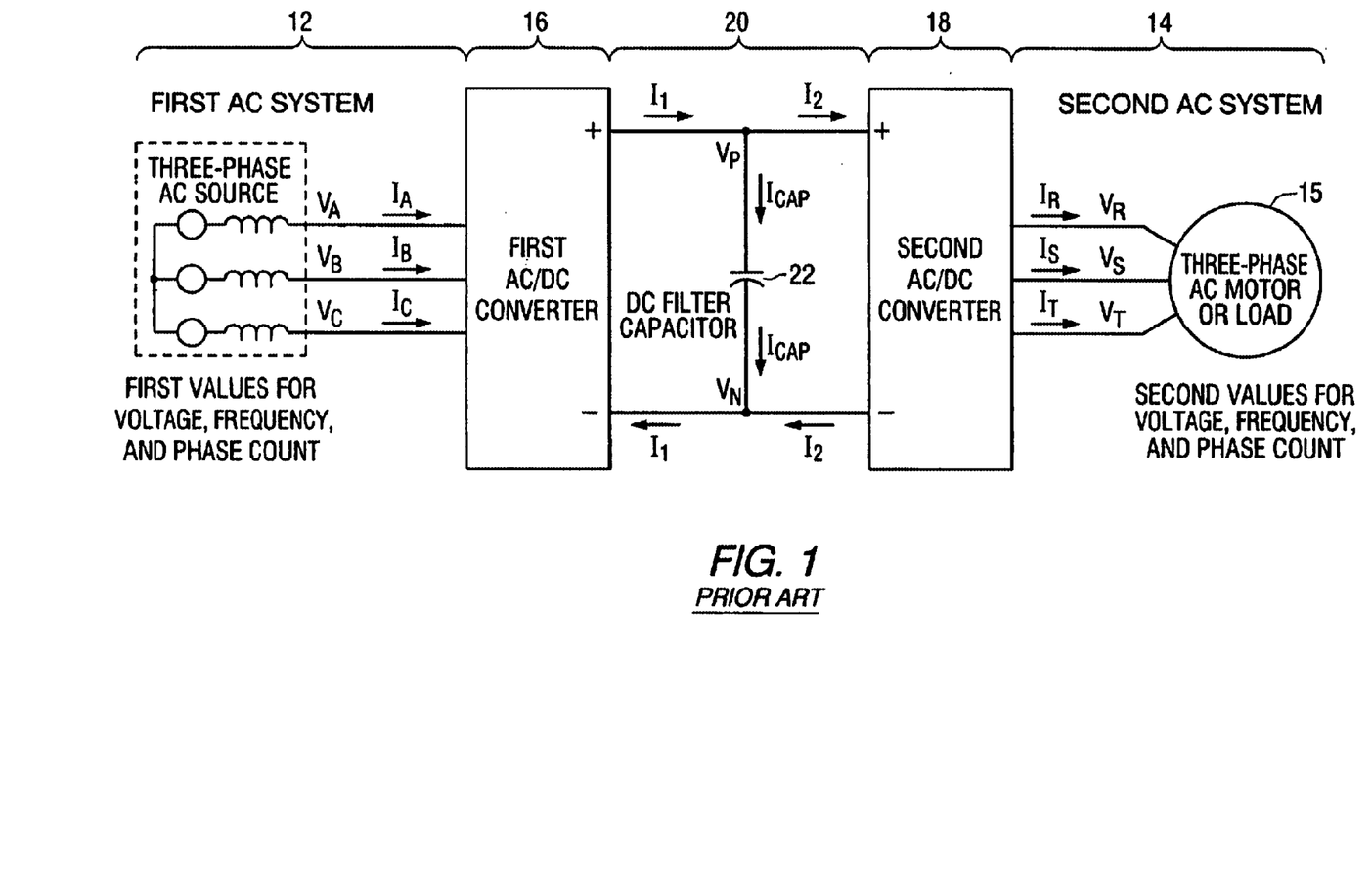
FIG. 1 is a diagram of a prior art type power supply with only one cell to control the flow of energy between two AC systems.

A better understanding of the invention may be had by first generally describing prior art type power supplies, an example of which is a single-cell power supply 10 shown in FIG. 1. The power supply 10 can be provided to control the flow of energy between a first AC system 12 at a first frequency, first voltage, and first phase count and a second AC system 14 at a second frequency, second voltage, and second phase count. The power supply 10 is commonly utilized in a wide variety of industrial applications, typically to control the operation of an AC motor 15. The cell in the power supply 10 is often implemented using first and second solid state converters 16, 18, respectively, connected by an intermediate DC link 20. The DC link 20 typically contains a DC filter capacitor 22 for smoothing the voltage at the DC terminals of both converters 16 and 18. Each converter 16, 18 has an AC side and a DC side. The DC side of each converter 16, 18 is the side connected to the capacitor 22, whereas the AC side of each converter 16, 18 is the side connected to the first and second AC systems 12, 14, respectively. The most common case is where the phase count in both AC systems 12, 14 is three, but, in general, the phase counts can have any integral value, and can be different in the two AC systems 12, 14.

The size of the DC filter capacitor 22 is dependent on both the r.m.s. current imposed on it and on the amount of capacitance required to hold the ripple on the DC voltage ("$V_{DC}$") within the design limits for the application. Both of these factors can be reduced if the current ("$I_{CAP}$") through the DC capacitor 22 can be reduced. Since the DC filter capacitor 22 is usually one of the largest and most expensive components in any power cell, it is very desirable to minimize its size and cost.

The capacitor current $I_{CAP}$ is equal to the difference between the DC-side current ("$I_1$") from the first converter 16 and the DC-side current ("$I_2$") into the second converter 18. Therefore, the capacitor current $I_{CAP}$ will be minimized if the two DC-side converter currents, $I_1$ and $I_2$, can be made as nearly equal as possible. Often the DC-side current $I_2$ into the second converter 18 is already determined by the requirements of the application, and cannot be controlled. In such cases the capacitor current $I_{CAP}$ will be minimized if the DC-side current $I_1$ from the first converter 16 is controlled to mimic the DC-side current $I_2$ into the second converter 18.

It must also be understood that, in certain instances, for example where a power regeneration mode is employed, the power flow can reverse, and will be converted in an opposite direction through the two converters 16, 18.

In either normal or regeneration mode, each of the two DC-side converter currents $I_1$, $I_2$ can be shown by Fourier analysis to contain a steady component and a series of alternating components. The steady components of $I_1$ and $I_2$ will automatically be equal because no steady current can flow through the DC filter capacitor 22. Therefore, only the alternating components of $I_1$ need be controlled to closely match as many of the alternating components of $I_2$ as possible. Some of the alternating components of $I_2$ will be related to the switching frequency of the semiconductors in the second converter 18. If the first converter 16 has a similar switching frequency, it generally may not be possible to control $I_1$ to match these components. This is because the control bandwidth of a switched-mode converter is always significantly lower than it's switching frequency. However, other alternating components of $I_2$ will be related to the operating frequency of the second AC system 14. If these components are sufficiently lower in frequency than the switching frequency of the first converter 16, then it can be possible to control $I_1$ to match these components.

Figure 2:
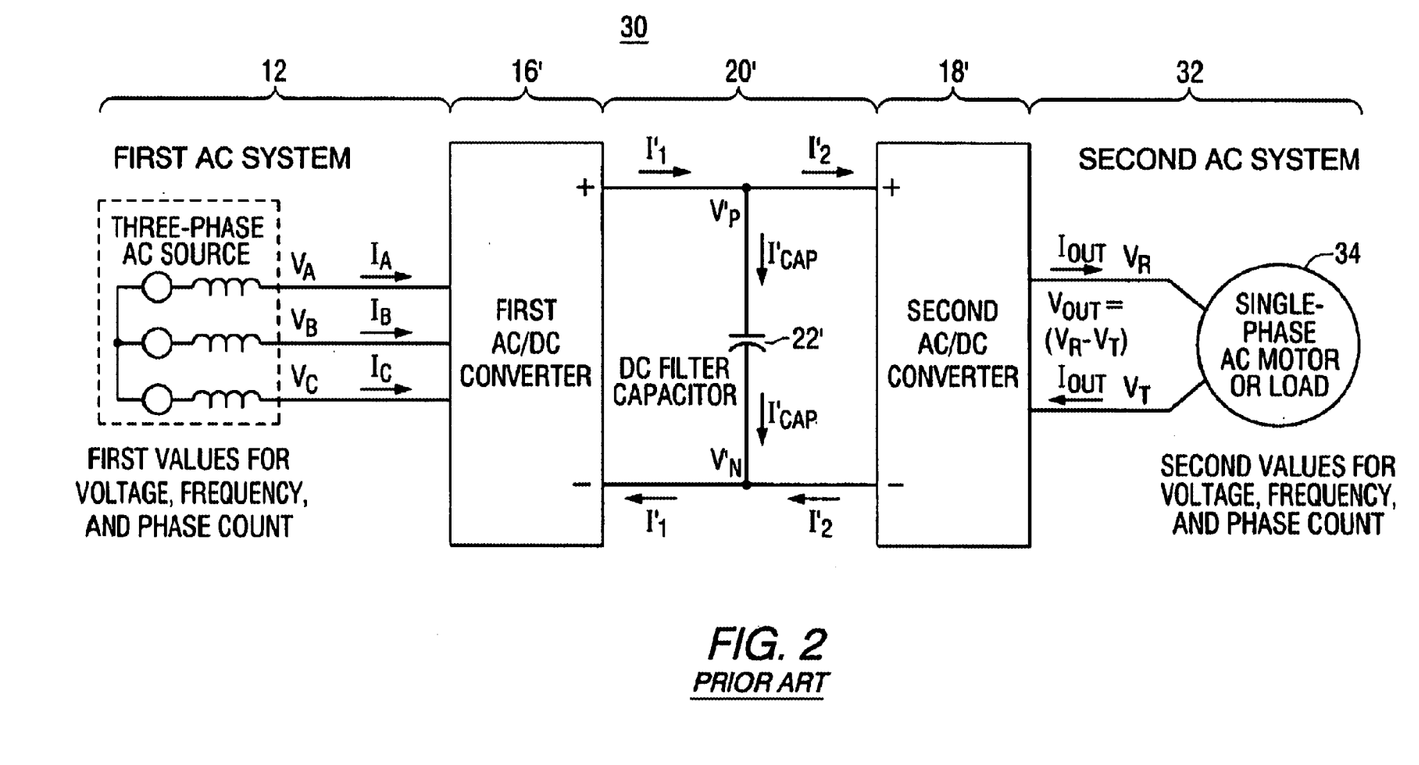
FIG. 2 is a diagram of a prior art power supply with only one cell to control the flow of energy between two AC systems wherein the second AC system is single-phase.

Referring now to FIG. 2, another prior art type single-cell power supply 30 is shown for controlling the flow of energy between first 12 and second 32 AC systems, respectively. The single-cell power supply 30 can be similar to the power supply 10, except that the second AC system 32 is single phase. In the case where the second AC system 32, for example an AC motor 34, has a phase count of one, the DC-side current $I_2'$ into the second converter 18' will have a component at twice the operating frequency of the second AC system 32. If the DC filter capacitor 22' were required to carry this large low-frequency component, it would have to be made very large to hold the ripple on the DC voltage $V_{DC}$ within the design limits for the application. This is because the impedance of a capacitor varies inversely with frequency. Consequently, a control method and apparatus for reducing the current through the DC link capacitor 22' can be especially beneficial in this type of system.

Figures 3A, 3B:
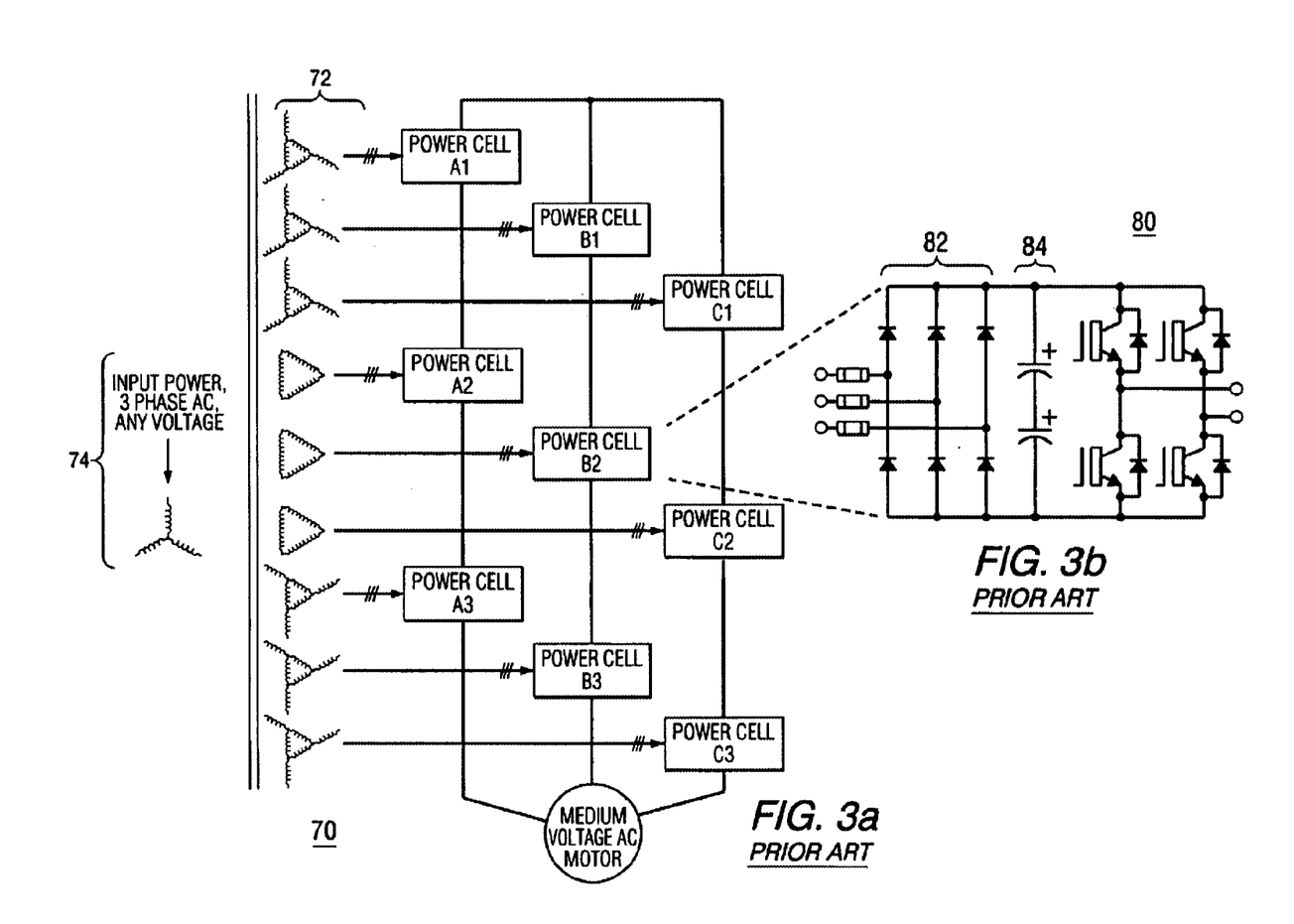

Referring now to FIGS. 3a and 3b, the topology of a multi-cell power supply 70 and typical power cell 80 are shown which generally correspond to that described in Applicant's U.S. Pat. Ser. No. 5,625,545 ("the '545 patent"), which is hereby incorporated herein by reference. In this topology, there is a deliberate phase shift between some of the multiple secondary winding circuits 72. The phase shifts are employed between some of the secondary winding circuits 72 of the transformer 74 in order to cancel low-order harmonic currents generated by the diode rectifier first converter 82.

Notice that in FIG. 3 the cells have single-phase outputs as shown in FIG. 2, even though the complete power supply has a three-phase output. Therefore the DC link capacitors in the cells of FIG. 3 will be required to carry a large alternating component at twice the operating frequency of the second AC system (the motor). Also, it should be noted that the first converter 82 in the power cell 80, shown in FIG. 5b, is a diode rectifier converter. Because the diode rectifier first converter 82 utilized in the power cell 80 cannot be controlled to reduce the current through the DC linking capacitors 84, the DC capacitor 84 in the power cell 80 must be large. Consequently, a control method and apparatus for reducing the current through the cell DC link capacitors can be especially beneficial in this type of system.

Figure 4:
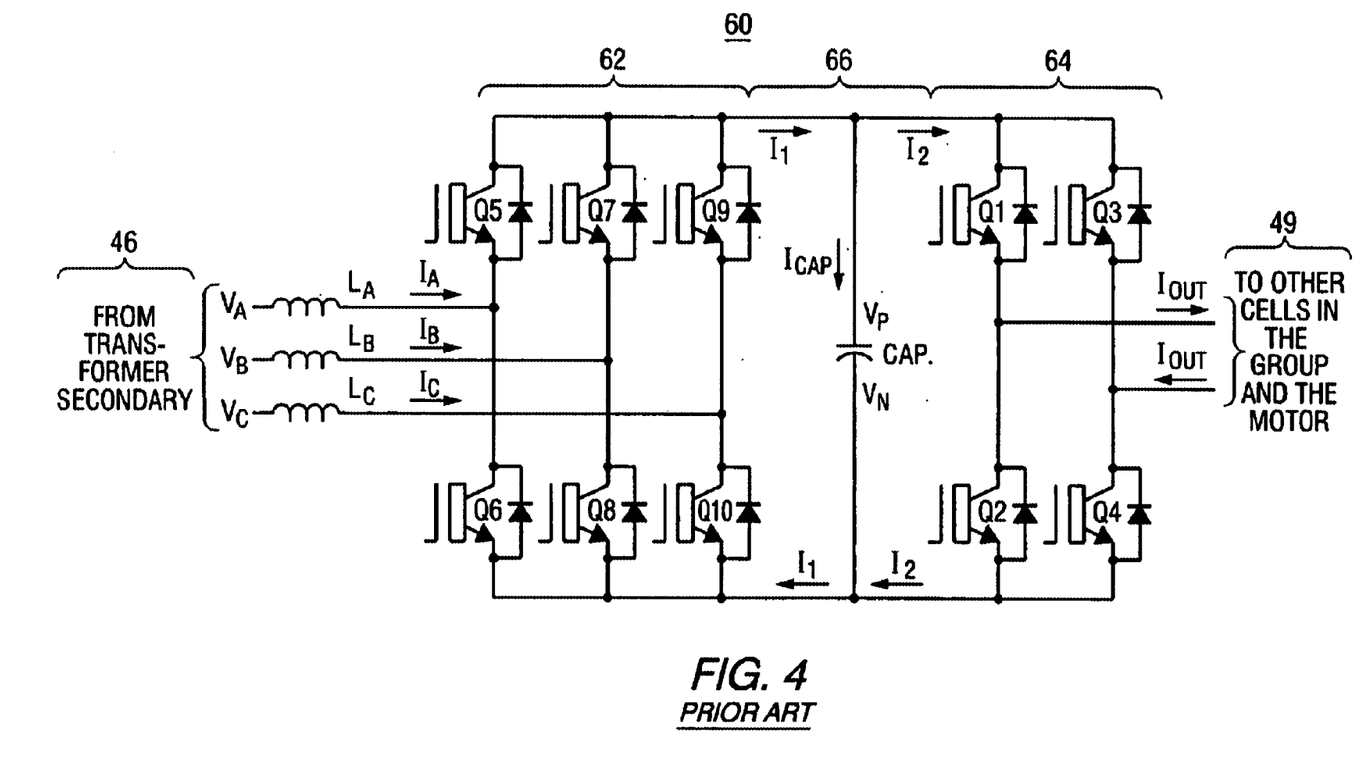
FIG. 4 is a diagram of a prior art power cell configuration utilizing IGBTs in the first converter.

FIG. 4 illustrates the configuration of a prior art type power cell 60 having a first converter 62 which utilizes semiconductor switching devices controlled by PWM, particularly IGBTs Q5–Q10, linked to a second converter 64 via a DC link capacitor 66. The reactances, $L_A$, $L_B$, and $L_C$, can be necessary to limit the current ripple caused by the PWM controlled first converter. The power cell 60 generally corresponds to a power cell disclosed in Applicant's U.S. Pat. Ser. No. 6,301,130, which is hereby incorporated herein by reference. That patent discloses a power cell as part of a power supply that provides four quadrant operation with reduced harmonics. The power supply described therein utilizes a multiphase, non phase shifted transformer with a single common inductive reactance connected to the input. Multiple series-connected power cells are utilized wherein each is configured for four quadrant operation and has a multiphase input and a single phase output. Each is controllable to reduce harmonics in both the input source line and the output line. Each power cell includes a three phase input converter, a smoothing filter, and a single phase output converter, wherein switching events at the output of each power cell are selectively controlled so that switching events in respective power cells are spaced apart in time to reduce harmonic components. This control is implemented using pulse width modulation based upon interdigitated carrier signals which control the output of each power cell.

Figure 5:
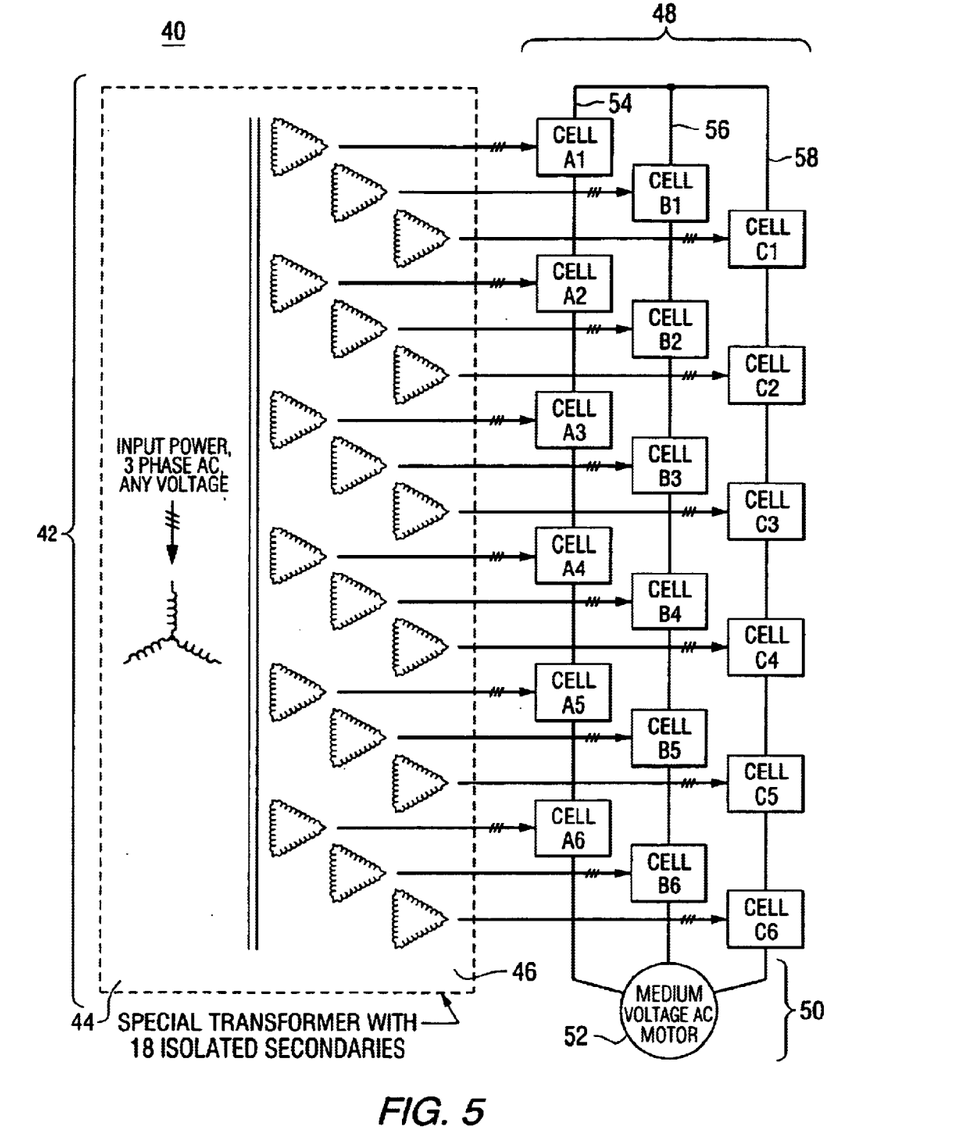

Referring now to FIG. 5, a presently preferred embodiment of a topology for a multi-cell power supply 40 similar to that shown in FIG. 3 can include a power transformer 42 having a primary winding circuit 44 and multiple secondary winding circuits 46. The power transformer can be connected to a first AC system (not shown), which can typically be a three phase AC power source. Each of the multiple secondary winding circuits 46 can be connected to an input of multiple power cells 48. Each of the secondary winding circuits 46 can have a like phase count and can be isolated from each of the other secondary winding circuits 46. The secondary winding circuits 46 can typically also be isolated from the primary winding circuit 44. In this particular embodiment of the power supply 40, 18 isolated low-voltage secondary winding circuits 46 can be provided, each connected to an input of an individual power cell A1–A6, B1–B6, and C1–C6. Each of the multiple power cells 48 can have an output connected to a second AC circuit, e.g., as shown in FIG. 5, the multiple power cells 48 can be arranged into three separate groups 54, 56 and 58, each having six power cells A1–A6, B1–B6, and C1–C6 respectively, which are connected in series. The second circuit is thus connected to the input of a second AC system, such as a medium voltage three phase AC motor 52. As shown, each of the three groups 54, 56, 58 of power cells drives a respective phase of the three phase AC motor 52. It should also be understood that the particular number of secondary winding circuits 46, and of power cells A1–A6, B1–B6, C1–C6 in each group 54, 56, 58, can be changed to achieve different voltage levels.

Each of the power cells 48 can have a configuration like the power cell 60 shown in FIG. 4. However, the reactances, $L_A$, $L_B$, and $L_C$, could be eliminated, since the requisite reactance could instead be provided, in part or in entirety, by the leakage reactance of a transformer with isolated secondaries 46, such as the transformer 42. Also, the reactance needed to limit the current ripple caused by the PWM controlled second converter 64 could similarly be provided by the leakage reactance of the motor 52.

The topology of the power supply 40 can be similar to that of the power supply 70 shown in FIG. 3a, except that each of the secondary winding circuits 46 can be identical. In particular, there need be no deliberate phase shift between some of the secondary winding circuits 46 as there is between the secondary winding circuits 72 in the power supply 70. Additionally, the first converter 82 of the power cell 80 in FIG. 3b is a diode rectifier converter, whereas the first converter 62 in the power cell 60 in FIG. 5 can preferably be a PWM controlled converter. Because the diode rectifier first converter 82 utilized in the power cell 80 cannot be controlled to reduce the current through the DC linking capacitors 84, the DC capacitor 84 in the power cell 80 must be large. In contrast, a power supply 40 based on a power cell using a PWM controlled first converter, such as in the power cell 60 for example, can be more compact because the DC link capacitor 66 can be smaller.

In a power supply like the power supply 70, phase shifts are required between some of the secondary winding circuits 72 of the transformer 74 in order to cancel low-order harmonic currents generated by the diode rectifier first converter 82. However, because a PWM controlled first converter can be controlled to eliminate these low-order harmonic currents, the need to phase shift some of the secondary winding circuits 46 of the power supply 40 can be eliminated. As a result, the transformer 42 of the power supply 40 can be made simpler and less expensively. Although a PWM first converter can generally be more expensive than a diode rectifier first converter, the cost savings which can be realized by using smaller DC capacitors and a simpler transformer can offset the difference. Furthermore, a power supply 40 based on a power cell configured similarly to the power cell 60 will be capable of regeneration, unlike a power supply 70 based on a power cell configured like the power cell 80.

Another way to describe a control method according to the invention is to say that in FIG. 1 certain alternating components of the current $I_{CAP}$ that would normally flow in the DC filter capacitor 22 are instead diverted through the first converter 16 into the first AC system 12. This reduces the current $I_{CAP}$ through the DC filter capacitor 22. However, a penalty for achieving this reduction in the capacitor current $I_{CAP}$ is that the distortion of the currents in the first AC system 12 is increased. Specifically, in each of the secondary winding circuits 46 shown in FIG. 3, the AC currents will be distorted by the alternating components of current that are diverted into them from the DC filter capacitor 66 via the first converter 62. However, when alternating components of the currents from respective groups of power cells 54, 56, 58 combine in the primary winding circuit 44 of the transformer 42, they can cancel similar components from other groups of power cells 54, 56, 58. As a result, this disadvantage can be overcome such that the primary current will generally not be distorted by the alternating components of the current diverted into the first AC system.

Figure 6A:
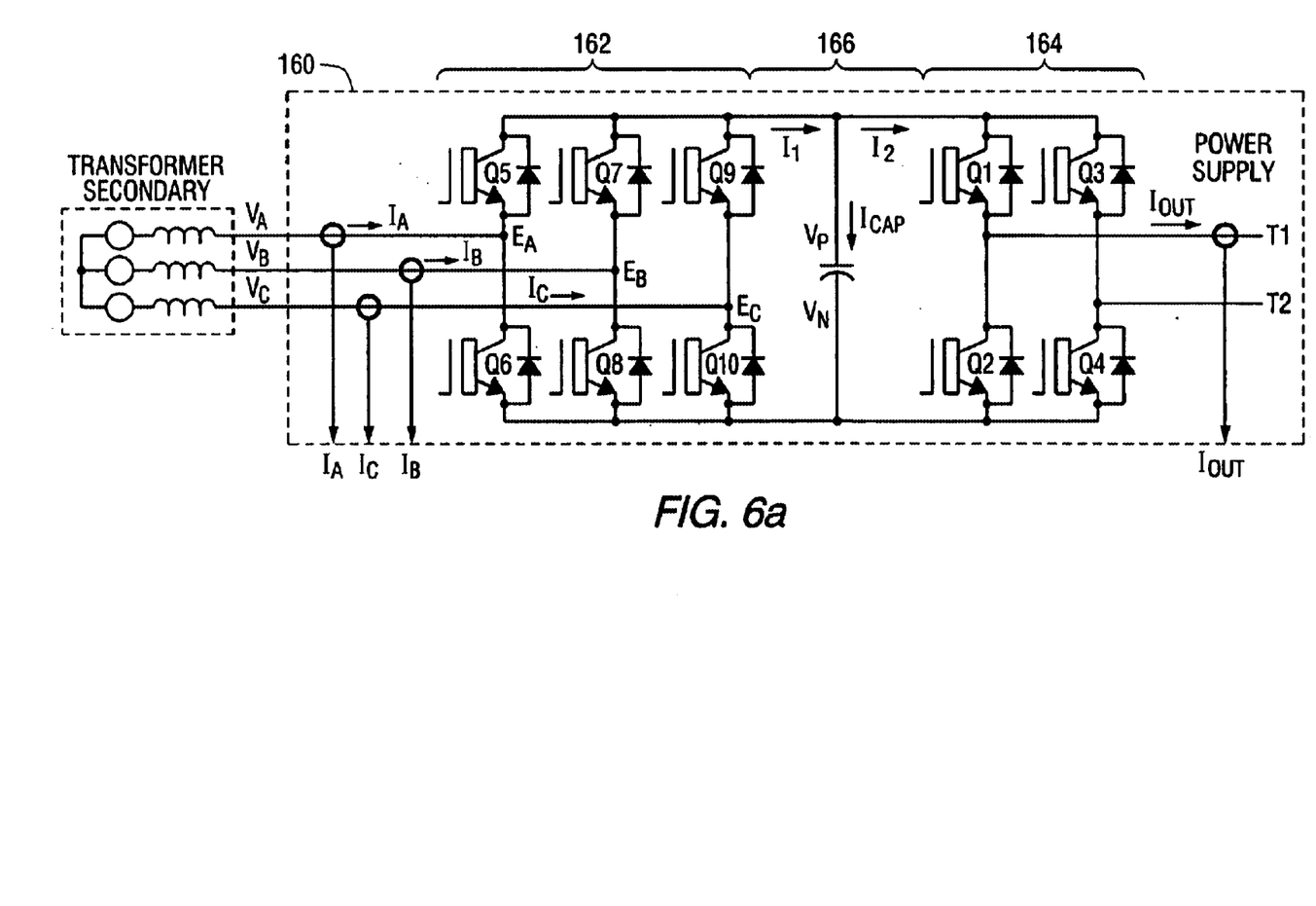
FIG. 6a illustrates an embodiment of a power cell for a power supply as shown in FIG. 5.
Figure 6B:
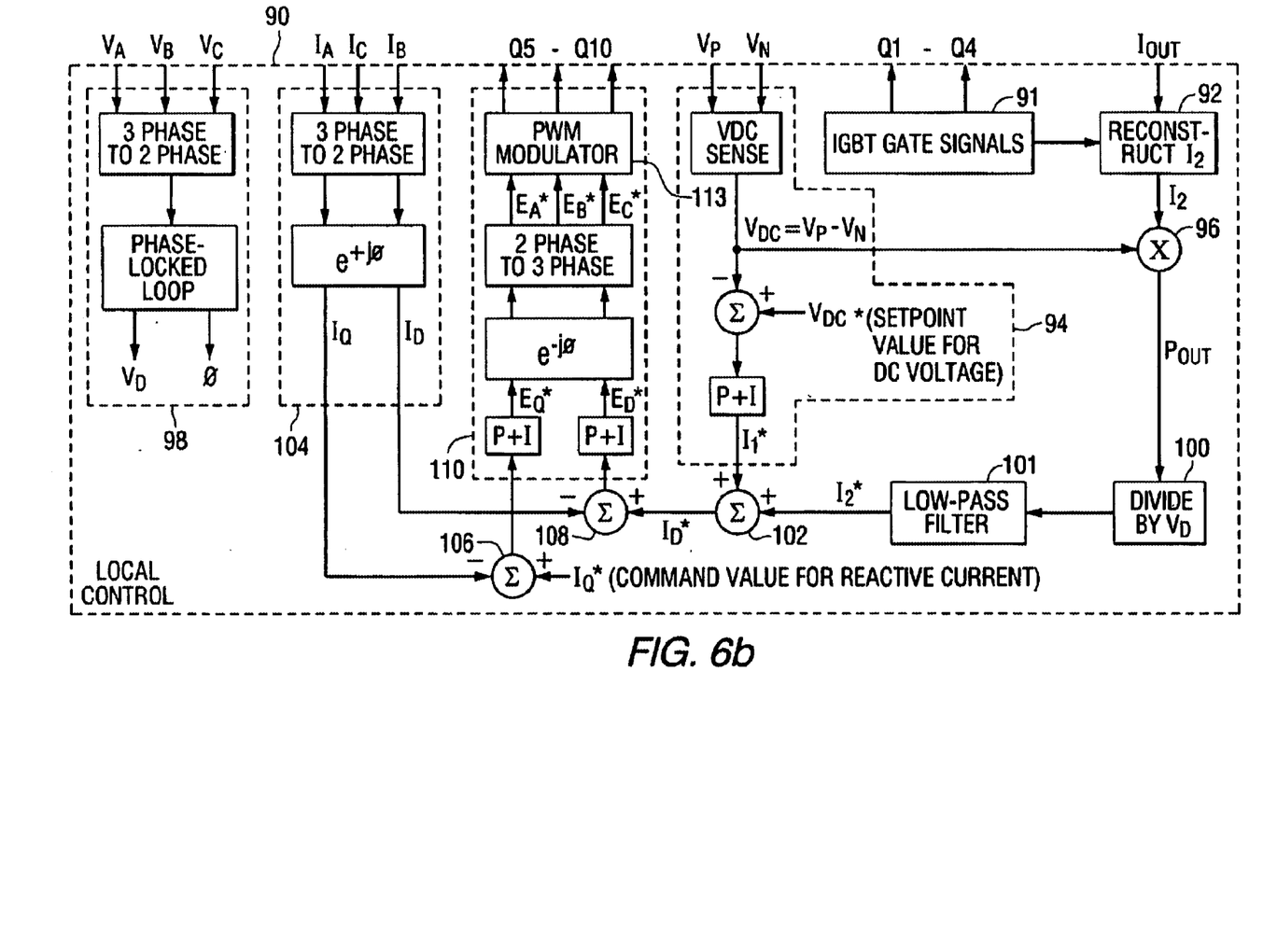

In view of the foregoing description with respect to FIG. 1, a presently preferred control method and apparatus according to the invention can be employed to reduce the current $I_{CAP}$ through the DC filter capacitor 22 linking the two static converters 16, 18, thus permitting the size and cost of the DC capacitor 22 to be reduced. In accordance therewith, FIGS. 6a and 6b illustrate presently preferred embodiments of a power cell 160 and a controller 90 which can be used in a power supply 40 as shown in FIG. 5. The controller 90 can be a local controller associated with each of the multiple power cells 48 used in the power supply 40. Each of the multiple power cells 48 can have a configuration corresponding to the power cell 160 in FIG. 6a. The local controller 90 can cause the DC-side current $I_1$ from the first, line side converter 162 to mimic the DC-side current $I_2$ into the second, load side converter 164, such that the two currents are caused to be nearly equal and the current $I_{CAP}$ through the DC capacitor 166 is thus reduced. However, this requires knowledge of the value of $I_2$, and also a means to control $I_1$.

One convenient way to obtain knowledge of the value of $I_2$ would be to employ a sensing device to directly measure $I_2$. However, often the connection between the DC filter capacitor 166 and the switching devices Q1–Q10 in the converters is made with a low-inductance bus-bar, which prevents the installation of such a sensor. Another simple way to obtain knowledge of the value of $I_2$ would be to use a sensing device to directly measure the capacitor current $I_{CAP}$. Yet, once again the low-inductance bus-bar often prevents the installation of this type of sensor as well. However, an estimate of the value of $I_2$ can be determined if the value of $I_{OUT}$ is known. Unlike $I_2$ and $I_{CAP}$, $I_{OUT}$ does not require low-inductance bus-bar and can be measured directly by an appropriate sensor.

Therefore, according to a presently preferred embodiment, an estimate of the value of $I_2$ can be determined by the local controller 90 at block 92 by reconstructing the value of $I_2$, using the value of $I_{OUT}$ and the state of the second, output converter 164 switching devices Q1–Q4. The state, i.e., "ON" or "OFF," of switching devices Q1–Q4 is available at block 91 because a master controller (not shown) commands the ON/OFF state of the switching devices Q1–Q4 and communicates those commands to the local controller 90.

Once the value of $I_2$ has been estimated, the second objective is to control $I_1$ to match $I_2$. However, it is difficult to control $I_1$ directly because $I_1$ is affected by the ON/OFF state of all of the switching devices Q5–Q10 in first converter 162. It is much easier to control the currents $I_A$, $I_B$, and $I_C$ into first converter 162. Therefore it is necessary to obtain command values for the currents $I_A$, $I_B$, and $I_C$ that will result in the desired value of $I_1$.

Since both converters 162 and 164 share the same DC-side voltage, forcing $I_1$ to match $I_2$ is equivalent to forcing the instantaneous power on the DC-side of the first converter 162 to match the instantaneous power on the DC-side of the second converter 164. Because the power losses in the two converters 162, 164 are very small, this is also equivalent to forcing the instantaneous power on the AC-side of the first converter 162 to match the instantaneous power on the DC-side of the second converter 164.

To estimate the instantaneous power on the DC-side of the second converter 164, at block 94, the local controller 90 can measure the voltage $V_{DC}$ across the DC filter capacitor 66 and, at block 96, multiply the value of $V_{DC}$ by the estimated value of $1_2$. This estimate then becomes the desired instantaneous power on the AC-side of the first converter 162.

To generate the command values for the currents $I_A$, $I_B$, and $I_C$ that will result in the desired instantaneous power on the AC-side of the first converter 162, the local controller 90 can also measure the AC voltages $V_A$, $V_B$, and $V_C$ into the first converter 162 at block 98. These signals can be converted to an amplitude $V_D$ and an angle $\phi$, at block 98. At block 100, $V_D$ is divided into the desired instantaneous power into the first converter 162 to obtain an estimate of the magnitude of the in-phase component of the required AC currents $I_A$, $I_B$, and $I_C$ into the first converter 162. This magnitude will be used to control the currents $I_A$, $I_B$, and $I_C$ as described below.

It is also necessary to hold the voltage $V_{DC}$ across the DC linking capacitor 166 near a pre-selected value. The local controller 90 can include for this purpose a voltage regulator 94 which subtracts the sensed value of $V_{DC}$ from the setpoint value, and applies proportional plus integral gain (P+I) to the resulting error signal, to generate an auxiliary current magnitude command value $I_1^*$. The local controller 90 can also employ a low-pass filter 101 to remove high-frequency components that are higher than the bandwidth of the first convertor 162 from the estimated value of current $I_2$, to obtain a filtered current command value $I_2^*$. The current magnitude command values $I_1^*$ and $I_2^*$ can then be summed at block 102 to provide a net in-phase current magnitude command value $I_D^*$ for use in controlling the AC side of the first converter 162.

A well known method to those skilled in the art to achieve fast control of current on the AC side of a converter is called "vector control." This method is described in the book "Control of Electrical Drives" by Dr. Werner Leonard (Springer-Verlag, 1985/1990, ISBN 3-540-13650-9). According to the vector control method, measured variables are transformed to a synchronously rotating coordinate system so that the regulators can operate with non-alternating values. The regulator outputs can then be transformed back to a stationary coordinate system. In blocks 104, 106, 108, and 110, a presently preferred embodiment of an implementation of such a vector control method is illustrated which can be employed to force the AC currents into the first converter 162 to follow the current command values to result in the desired value of $I_D^*$. The end result accomplished by the local controller 90 is that the current $I_1$ out of the first converter 162 is caused to mimic the current $I_2$ into the second converter 164, such that the current through the DC linking capacitor 166 is reduced, thereby permitting smaller, less expensive capacitors to be utilized.

In block 104 the measured three phase input current values, $I_A$, $I_B$, $I_C$, are transformed to two phase and translated into the rotating coordinate system described above. Output values $I_Q$ (quadrature) and $I_D$ (in-phase) are thereafter separately subtracted from current command values $I_Q^*$ (usually zero) and $I_D^*$, at blocks 106 and 108, respectively, to generate current error signals for block 110. At block 110, the current error signals drive regulators with proportional plus integral gain (P+I) to generate the voltage commands $E_Q^*$ and $E_D^*$, which are then translated from the rotating coordinate system back into the stationary coordinate system. Next, the variables are converted back to three phase, thus producing voltage variables $E_A^*$, $E_B^*$, and $E_C^*$ which are used by the PWM modulator 113 as command signals for controlling the first converter 162, and more specifically the switching devices Q4–Q10, of the power cell 160 to cause the output current $I_1$ of the first converter 162 to mimic the input current $I_2$ of the second converter 164. In this manner, the current $I_{CAP}$ through the capacitor 166 can be reduced.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method for reducing current through a DC capacitor linking a first converter connected to a first AC circuit and a second converter connected to a second AC circuit, wherein said current through said DC capacitor is generally equal to the difference between a DC-side current of said first converter and a DC-side current of said second converter, said method comprising:
   a. determining a first value representative of said DC-side current of said second converter; and
   b. controlling said first converter to cause said DC-side current of said first converter to approach a second value generally equal to said first value such that current through said DC capacitor is reduced.

2. The method of claim 1 wherein the step of determining a value representative of said DC-side current of said second converter further comprises:
   a. measuring an AC-side current of said second converter;
   b. said second converter having a plurality of switching devices each having an ON/OFF state;
   c. detecting said ON/OFF state of each of said plurality of switching devices; and
   d. estimating said DC-side current of said second converter utilizing said AC-side current of said second converter and said ON/OFF state of each of said plurality of switching devices.

3. The method of claim 1 wherein the step of controlling said first converter further comprises determining a desired AC-side current of said first converter which generally results in said second value for said DC-side current of said first converter.

4. A method for reducing current through a DC capacitor linking a first converter connected to a first AC circuit and a second converter connected to a second AC circuit, wherein said current through said DC capacitor is generally equal to the difference between a DC-side current of said first converter and a DC-side current of said second converter, said method comprising:
a. determining a first value representative of said DC-side current of said second converter;
b. controlling said first converter to cause said DC-side current of said first converter to approach a second value generally equal to said first value such that current through said DC capacitor is reduced;
c. wherein the step of determining a value representative of said DC-side current of said second converter further comprises:
   i. measuring an AC-side current of said second converter;
   ii. said second converter having a plurality of switching devices each having an ON/OFF state;
   iii. detecting said ON/OFF state of each of said plurality of switching devices; and
   iv. estimating said DC-side current of said second converter utilizing said AC-side current of said second converter and said ON/OFF state of each of said plurality of switching devices;
d. wherein the step of controlling said first converter further comprises determining a desired AC-side current of said first converter which generally results in said second value for said DC-side current of said first converter; and
e. wherein said step of controlling said first converter further comprises:
   i. filtering high frequency components from said estimated DC-side current of said second converter to obtain an auxiliary current command value; and
   ii. using said auxiliary current command value to control said AC side current of said first converter to cause said DC-side current of said first converter to approach said second value.

5. A method for reducing current through a DC capacitor linking a first converter connected to a first AC circuit and a second converter connected to a second AC circuit, wherein said current through said DC capacitor is generally equal to the difference between a DC-side current of said first converter and a DC-side current of said second converter, said method comprising:
a. determining a first value representative of said DC-side current of said second converter;
b. controlling said first converter to cause said DC-side current of said first converter to approach a second value generally equal to said first value such that current through said DC capacitor is reduced;
c. wherein the step of determining a value representative of said DC-side current of said second converter further comprises:
   i. measuring an AC-side current of said second converter;
   ii. said second converter having a plurality of switching devices each having an ON/OFF state;
   iii. detecting said ON/OFF state of each of said plurality of switching devices; and
   iv. estimating said DC-side current of said second converter utilizing said AC-side current of said second converter and said ON/OFF state of each of said plurality of switching devices;
d. wherein the step of controlling said first converter further comprises determining a desired AC-side current of said first converter which generally results in said second value for said DC-side current of said first converter; and
e. wherein the step of controlling said first converter further comprises using a vector control method to cause an actual AC-side current of said first converter to approach said desired value for said AC-side current of said first converter.

6. The method of claim 1 wherein the step of controlling said first converter further comprises using pulse width modulation.

7. A method for reducing current through a DC capacitor linking a first converter connected to a first AC circuit and a second converter connected to a second AC circuit, wherein said current through said DC capacitor is generally equal to the difference between a DC-side current of said first converter and a DC-side current of said second converter, said method comprising:
a. determining a first value representative of said DC-side current of said second converter;
b. controlling said first converter to cause said DC-side current of said first converter to approach a second value generally equal to said first value such that current through said DC capacitor is reduced; and
c. wherein the step of controlling said first converter further comprises:
   i. measuring voltage across said DC capacitor;
   ii. subtracting said measured voltage from a desired voltage to obtain an error signal;
   iii. applying proportional plus integral gain to said error signal to obtain a first auxiliary current command value; and
   iv. using said first auxiliary current command value to control said first converter to cause said measured voltage across said DC capacitor to approach said desired voltage.

8. The method of claim 7 wherein said step of controlling said first converter further comprises:
a. filtering high frequency components from said estimated DC-side current of said second converter to obtain a second auxiliary current command value; and
b. using said second auxiliary current command value to control said AC side current of said first converter to cause said DC-side current of said first converter to approach said second value.

9. The method of claim 8 further comprising said local controller summing said first and second auxiliary current command values to provide a net current command value to control said AC side current of said first converter.

10. A power supply connectable between first and second AC systems, said power supply comprising:
a. a power transformer having at least one primary winding circuit connectable to said first AC system and a plurality of secondary winding circuits;
b. a plurality of power cells each having a first converter connected to respective ones of said plurality of secondary winding circuits, a second converter connected to a second AC circuit, and a DC capacitor linking said first and second converters, said second AC circuit connectable to said second AC system; and
c. a local controller causing a DC-side current of said first converter to approach in value a DC-side current of said second converter such that current through said DC capacitor is minimized.

11. The power supply of claim 10 further comprising each of said secondary windings having an equal phase count.

12. The power supply of claim 10 further comprising each of said secondary winding circuits being isolated from other winding circuits.

13. The power supply of claim 10 wherein said second AC system is a multiphase second AC system and said plurality of power cells further comprises:
 a. a plurality of groups of power cells wherein power cells in each respective group are connected in series via said second AC circuit; and
 b. said second AC circuit of each power cell in each respective group connectable to a respective phase of said multiphase second AC system.

14. The power supply of claim 10 further comprising:
 a. said second converter having a plurality of switching devices;
 b. a master controller controlling an ON/OFF state of said plurality of switching devices;
 c. said local controller measuring an AC-side current of said second converter; and
 d. said local controller estimating said DC-side current of said second converter using said AC-side current of said second converter and said ON/OFF states of said plurality of switching devices.

15. The power supply of claim 10 wherein said local controller determines a desired AC-side current of said first converter which generally results in said DC-side current of said first converter approaching in value a DC-side current of said second converter.

16. A power supply connectable between first and second AC systems, said power supply comprising:
 a. a power transformer having at least one primary winding circuit connectable to said first AC system and a plurality of secondary winding circuits;
 b. a plurality of power cells each having a first converter connected to respective ones of said plurality of secondary winding circuits, a second converter connected to a second AC circuit, and a DC capacitor linking said first and second converters, said second AC circuit connectable to said second AC system;
 c. a local controller causing a DC-side current of said first converter to approach in value a DC-side current of said second converter such that current through said DC capacitor is minimized;
 d. wherein said local controller determines a desired AC-side current of said first converter which generally results in said DC-side current of said first converter approaching in value a DC-side current of said second converter; and
 e. a low pass filter for removing high frequency components from said DC-side current of said second converter to obtain an auxiliary current command value, and said local controller using said second auxiliary current command value to control said AC side current of said first converter.

17. A power supply connectable between first and second AC systems, said power supply comprising:
 a. a power transformer having at least one primary winding circuit connectable to said first AC system and a plurality of secondary winding circuits;
 b. a plurality of power cells each having a first converter connected to respective ones of said plurality of secondary winding circuits, a second converter connected to a second AC circuit, and a DC capacitor linking said first and second converters, said second AC circuit connectable to said second AC system;
 c. a local controller causing a DC-side current of said first converter to approach in value a DC-side current of said second converter such that current through said DC capacitor is minimized;
 d. a voltage regulator associated with said local controller to generally maintain voltage across said DC capacitor at a desired voltage;
 e. said voltage regulator producing an error signal based on subtracting measured voltage across said DC capacitor from said desired voltage;
 f. said voltage regulator producing a first auxiliary current command value by applying proportional plus integral gain to said error signal; and
 g. said voltage regulator using said first auxiliary current command value to cause voltage across said DC capacitor to approach said desired voltage.

18. The power supply of claim 17 further comprising a low pass filter for removing high frequency components from said DC-side current of said second converter to obtain a second auxiliary current command value, and said local controller using said second auxiliary current command value to control said AC side current of said first converter.

19. The power supply of claim 18 further comprising said local controller summing said first and second current command values to provide a net current command value to control said AC side current of said first converter such that said DC-side current of said first converter approaches in value said DC-side current of said second converter.

20. The power supply of claim 10 further comprising a pulse width modulator to control said first converter.

21. The power supply of claim 10 wherein said DC capacitor further comprises a film type capacitor.

22. A power cell connectable between first and second AC circuits, said power cell comprising:
 a. a first converter having an AC side and a DC-side, said AC side connectable to said first AC circuit;
 b. a second converter having an AC side and a DC-side, said AC side connectable to said second AC circuit;
 c. a DC capacitor connected between said DC-sides of said first and second converters; and
 d. a local controller causing a DC-side current of said first converter to approach in value a DC-side current of said second converter such that current through said DC capacitor is minimized.

23. The power cell of claim 22 further comprising:
 a. said second converter having a plurality of switching devices;
 b. each of said plurality of switching devices having a controllable ON/OFF state;
 c. said local controller measuring an AC side current of said second converter; and
 d. said local controller estimating said DC-side current of said second converter using said AC side current of said second converter and said ON/OFF state of said plurality of switching devices.

24. The power cell of claim 22 wherein said local controller determines a desired AC-side current of said first converter which generally results in said DC-side current of said first converter approaching in value a DC-side current of said second converter.

25. A power cell connectable between first and second AC circuits, said power cell comprising:
 a. a first converter having an AC side and a DC-side, said AC side connectable to said first AC circuit;
 b. a second converter having an AC side and a DC-side, said AC side connectable to said second AC circuit;
 c. a DC capacitor connected between said DC-sides of said first and second converters;
 d. a local controller causing a DC-side current of said first converter to approach in value a DC-side current of said second converter such that current through said DC capacitor is minimized;

e. wherein said local controller determines a desired AC-side current of said first converter which generally results in said DC-side current of said first converter approaching in value a DC-side current of said second converter; and f. a low pass filter for removing high frequency components from said DC-side current of said second converter to obtain an auxiliary current command value, and said local controller using said second auxiliary current command value to control said AC side current of said first converter.

26. A power cell connectable between first and second AC circuits, said power cell comprising:

a. a first converter having an AC side and a DC-side, said AC side connectable to said first AC circuit;

b. a second converter having an AC side and a DC-side, said AC side connectable to said second AC circuit;

c. a DC capacitor connected between said DC-sides of said first and second converters;

d. a local controller causing a DC-side current of said first converter to approach in value a DC-side current of said second converter such that current through said DC capacitor is minimized;

e. a voltage regulator associated with said local controller to generally maintain voltage across said DC capacitor at a desired voltage;

f. said voltage regulator producing an error signal based on subtracting measured voltage across said DC capacitor from said desired voltage;

g. said voltage regulator producing a first auxiliary current command value by applying proportional plus integral gain to said error signal; and h. said voltage regulator using said first auxiliary current command value to cause voltage across said DC capacitor to approach said desired voltage.

27. The power cell of claim 26 further comprising a low pass filter for removing high frequency components from said DC-side current of said second converter to obtain a second auxiliary current command value, and said local controller using said second auxiliary current command value to control said AC side current of said first converter.

28. The power cell of claim 27 further comprising said local controller summing said first and second current command values to provide a net current command value to control said AC side current of said first converter such that said DC-side current of said first converter approaches in value said DC-side current of said second converter.

29. The power cell of claim 22 further comprising a pulse width modulator to control said first converter.

30. The power cell of claim 22 wherein said DC capacitor further comprises a film type capacitor.

* * * * *